(12) United States Patent
Barnett et al.

(10) Patent No.: US 6,381,614 B1
(45) Date of Patent: Apr. 30, 2002

(54) RECIPE DATABASE THAT INTEGRATES MENUS FOR FOOD PREPARATION OF MULTIPLE DISHES BASED ON SKILL LEVEL

(75) Inventors: Jeffery R. Barnett; Katherine Hoyland Barnett, both of McLean, VA (US)

(73) Assignee: Basil Road Software, LLC, McLean, VA (US)

( * ) Notice: Subject to any disclaimer, the term of this patent is extended or adjusted under 35 U.S.C. 154(b) by 0 days.

(21) Appl. No.: 09/575,362

(22) Filed: May 22, 2000

(51) Int. Cl.[7] .............................................. G06F 17/30
(52) U.S. Cl. ..................... 707/104.1; 708/133; 712/206
(58) Field of Search .............................. 707/104.1, 10; 708/133; 99/486; 706/13, 16; 712/206; 705/7; 235/61 A; 700/14

(56) References Cited

U.S. PATENT DOCUMENTS

| | | | |
|---|---|---|---|
| 3,731,059 A | * 5/1973 | Willson ..................... 235/61 A |
| 4,405,991 A | 9/1983 | Stanely ........................ 708/133 |
| 4,517,429 A | 5/1985 | Horinouchi ................... 219/708 |
| 4,807,169 A | 2/1989 | Overbeck ..................... 708/200 |
| 4,872,112 A | 10/1989 | Hungerford .................... 700/90 |
| 5,101,368 A | 3/1992 | Kaplan ......................... 708/206 |
| 5,877,477 A | 3/1999 | Petty et al. .................. 219/506 |
| 5,899,502 A | 5/1999 | Del Giorno ................... 283/67 |
| 5,960,440 A | 9/1999 | Brenner et al. ........... 707/104.1 |
| 6,236,974 B1 | * 5/2001 | Kolawa et al. ................. 705/7 |

* cited by examiner

Primary Examiner—Jack M. Choules
Assistant Examiner—Greta Robinson
(74) Attorney, Agent, or Firm—Miles & Stockbridge P.C.

(57) ABSTRACT

A system and method for recipe integration provides a single timeline for a cook preparing a meal of several different dishes. A food recipe integration computer combines steps from the recipes of the individual dishes and de-conflicts steps as necessary such that the cook is not required to perform multiple actions at once. The single timeline is a list of steps and corresponding times for preparing the dishes to be ready at the selected times. The time allocated to a given step may be greater for a beginning cook than for a more skilled cook. Optionally, one or more steps in a list are more detailed for less skilled cooks and less detailed for cooks having higher skills.

24 Claims, 8 Drawing Sheets

FIG. 1

| MENU INTEGRATOR (Recipe Integrator) |||| 
|---|---|---|---|
| Soufflé | Cook carefully over low heat until thick and lemon-yellow. Continue beating over ice to cool, and add Grand Marnier. | - 4:45 | 1:15 PM |
| Soufflé | Fold this into the whipped cream. | - 4:30 | 1:30 PM |
| Soufflé | Beat the egg whites until stiff peaks form and fold them into the souffle mixture. | - 4:15 | 1:45 PM |
| Soufflé | Whip cream with sugar until soft peaks form. Set aside. | - 5:15 | 2:45 PM |
| Soufflé | Beat the yolks with the remaining sugar and water. | - 5:00 | 3:00 PM |
| Spaghetti | Cut tofu into 2"x1/2"x1/8" pieces. [Press tofu first, if it's a bit soft.] | ≤ 3:25 | 3:35 PM |
| Spaghetti | Marinate the tofu pieces for at least 2 hours. | ≤ 3:15 | 3:45 PM |
| Soufflé | Pipe into a buttered dish with a paper collar and freeze. | - 4:00 | 4:00 PM |
| Zucchini | Place zucchini in a large deep skillet and add enough boiling water to cover. | - 1:20 | 5:40 PM |
| Zucchini | Cook for 10 to 12 minutes, then chill quickly under cold water. | - 1:18 | 5:42 PM |
| Spaghetti | Heat a large skillet or wok, add 1T oil. | ≤ 1:15 | 5:45 PM |
| Spaghetti | Add the tofu and any leftover marinade. Brown tofu slightly; stir occasionally | ≤ 1:10 | 5:50 PM |
| Zucchini | Cut off stem end of each zucchini and split lengthwise. | - 1:05 | 5:55 PM |
| Spaghetti | Set aside. | ≤ 1:01 | 5:59 PM |
| Spaghetti | Add broccoli and peas to 1" boiling water; boil until almost tender. | ≤ 1:00 | 6:00 PM |
| Zucchini | Starting from wide end of vegetable, scoop out pulp with a spoon, leaving a 1/2 inch thick shell; reserve pulp. Place shells in a 9x13 baking dish. | - 1:00 | 6:00 PM |
| Zucchini | Preheat oven to 350. | - 1:00 | 6:00 PM |
| Zucchini | In a food processor mince scallions, green peppers, and parsley. | - :50 | 6:10 PM |
| Spaghetti | Drain, reserving water. | ≤ :46 | 6:14 PM |
| Spaghetti | Saute mushrooms in 1T oil till soft [same skillet as tofu]. Set aside. | ≤ :45 | 6:15 PM |
| Zucchini | Add drained tomatoes (preserve the liquid), preserved zucchini pulp, turkey, spices, and bulgur and process until well mixed. | - :45 | 6:15 PM |
| Zucchini | Generously spoon mixture into scooped zucchini shells. Add enough water to reserved tomato liquid to make 1 cup, stir in a little tomato paste, and pour around the bottom of baking dish. | - :40 | 6:20 PM |
| Zucchini | Cover pan with foil and bake for 35 minutes, removing foil every 10 minutes to baste with liquid. | - :35 | 6:25 PM |
| Spaghetti | Cook spaghetti. | - :30 | 6:30 PM |
| Zucchini | Remove foil; baste with liquid | - :25 | 6:35 PM |
| Spaghetti | Let oil and flour bubble together gently over low heat for 3 minutes [tofu skillet]. | - :23 | 6:37 PM |
| Spaghetti | Whisk in the reserved cooking water, without making lumps. | - :19 | 6:41 PM |
| Spaghetti | Add parsley, salt, garlic powder, and cayenne. | - :16 | 6:44 PM |
| Spaghetti | Cook over low heat till thickned and smooth. | - :15 | 6:45 PM |
| Zucchini | Remove foil; baste with liquid | - :15 | 6:45 PM |
| Zucchini | Remove foil completely for last 5 minutes of baking. | - :05 | 6:55 PM |
| Spaghetti | Stir in tofu, mushrooms, and vegetables. | - :02 | 6:58 PM |
| Spaghetti | Serve hot over the spaghetti. | Serve | 7:00 PM |
| Zucchini | Serve hot with lemon wedges. | Serve | 7:00 PM |
| Soufflé | Remove collar to serve and dust with cocoa. | Serve | 8:00 PM |

RECIPE DATABASE THAT INTEGRATES MENUS FOR FOOD PREPARATION OF MULTIPLE DISHES BASED ON SKILL LEVEL

BACKGROUND OF THE INVENTION

The present invention relates to a recipe computer system and method. More specifically, it relates to use of a recipe computer to provide a single timeline when preparing a plurality of dishes. (As used herein, "dish" shall mean a particular kind of food, not a plate or other container for food. "Dishes" will likewise refer to a several particular kinds of food.)

When preparing a meal having several different dishes, it is sometimes difficult to have all of the dishes ready at the proper time. Indeed, a beginning cook may have difficulty timing even a one-course three-dish meal so that all dishes are ready at the same time. Taking a simple example where the meal consists of broiled salmon, green beans, and rice, diners are unlikely to enjoy the meal if the salmon is left in the oven and dries from overcooking because the rice is not ready. Likewise, if one of the three dishes gets cold while waiting for another of the three dishes to be ready, the quality of the meal will be reduced. The goal is to have all dishes of such a simple one-course meal ready at the same time or as close as possible to the same time. This is difficult for a cook looking at different cook books or looking at different pages of a single cook book. Flipping between recipes for the different dishes, the cook is more likely to make a mistake such as forgetting a step or mistiming a step.

A more experienced cook would be less likely than a beginning cook to have problems in a simple one-course meal, but may still be challenged in timing different dishes when there are a larger number of dishes and/or the meal is a multiple-course meal. Even for a cook of considerable experience, cooking a meal having one or more new dishes may present the same sort of problem that a less-skilled cook has with a simple meal. The problem is to keep all the recipes straight and to do each task as needed to finish each of the dishes at the right time. An experienced cook preparing a meal of more than one new dish (i.e., a dish that he or she has not cooked before) may still end up flipping between recipes. Further, even when an experienced cook knows the recipes of all dishes being prepared, coordinating the different steps and remembering when to switch from working on one dish to another can require a high level of attention that might be better directed to, for example, observing whether the pasta is al dente or whether more stirring of another dish is needed.

The flipping from recipe to recipe and the use of considerable mental energy in remembering and ordering steps from different dishes are both factors that contribute to errors which reduce the quality of a meal.

Various U.S. patents have disclosed techniques of helping a cook with the steps in preparing a meal and related areas.

The Overbeck U.S. Pat. No. 4,807,169 patent discloses a food preparation information system whereby preparation instructions are supplied in sequence. Its abstract refers to combining and preparing food dishes. Different dishes are combined for the cook's consideration, but the individual steps in the preparation and cooking of those dishes are apparently left to the cook to coordinate. Instead of requiring a cook to shift between recipes on different pages (from a single cook book or multiple cook books), it apparently requires the cook to use menu (dish) jump or skip keys 11 and 12 to shift between different dishes or between different meals.

The Brenner U.S. Pat. No. 5,960,440 shows a recipe database system with timers for various preparation steps. The system allows easy switching between an ingredient list and a preparation instruction list. It adjusts ingredient amounts depending on serving size.

The Hungerford U.S. Pat. No. 4,872,112 patent shows a recipe calculator that scales recipes depending on the number of servings that are being prepared.

The Stanley U.S. Pat. No. 4,405,991 patent is a kitchen calculator for determining cooking time based on the quantity that is being cooked.

The Del Giomo U.S. Pat. No. 5,899,502 patent discloses a system that personalizes recipes based on food allergies and preferences.

Both the Horinouchi U.S. Pat. No. 4,517,429 patent and the Petty U.S. Pat. No. 5,877,477 patent disclose ovens with heating controlled by a recipe in a database.

Although some of the prior arrangements have been generally useful, they have often been subject to one or more of several disadvantages. Many prior cook helping processes or devices have insufficient flexibility in meal planning. For example, instructions for an entire pre-planned meal (consisting of several individual dishes) are available in cookbooks, CDs, the internet, and floppy disks. However, changes to these pre-planned meals are not possible. Instructions are for a single group of dishes in a single meal. Substitutions are not possible. The inability to pick a side dish from one meal plan and a main dish from another meal plan is a real limitation on the adaptability of those arrangements using pre-planned meals. Often such processes or devices provide insufficient detail for a beginning cook or provide too many details for an experienced cook. Those prior processes or devices that require switching from one mode to another in order to switch between instructions from one dish to another have many of the disadvantages of flipping between pages of one or more cook books. Prior processes or devices often do not work at all with multiple course meals. Prior processes or devices often require a cook to calculate totals and to calculate backwards using a recipe for a particular dish. For example, if a recipe calls for 5 minutes of a first step, 6 minutes of a second step, 10 minutes of a third step, and 3 minutes of a fourth step, the cook must add those times to get 24 minutes. Then the cook must subtract the 24 minutes from the desired serving time to get the starting time for the first step. From there the time of each step can be calculated. Finally, these time intervals are set irrespective of the skill level of the cook. Whether the cook is experienced or a novice, the preparation time for each step in the recipe is the same. No allowance is made for skill level.

Generally, prior processes or devices do not provide as much help to a cook as is desirable.

OBJECTS AND SUMMARY OF THE INVENTION

Accordingly, it is a primary object of the present invention to provide a new and improved recipe computer system and method.

A more specific object of the present invention is to provide a menu integration technique that combines steps from several dishes (i.e., integrates recipes) into a single timeline.

A further object of the present invention is to provide an extremely flexible and powerful technique to help cooks.

A further object of the present invention is to help cooks so that their energies can be directed to observing and controlling various cooking processes, instead of recalling routine information such as specific orders of steps or specific times of taking actions.

Yet another object of the present invention is to provide a recipe integration technique where a cook is automatically notified when a particular step is to be taken.

The above and other features of the present invention which will be more readily understood when the following detailed description is considered in conjunction with the accompanying drawings are realized by a process for automatic food recipe integration as an aid to a cook. The process includes the steps of: selecting a plurality of dishes for food preparation as part of a meal, each dish having a corresponding recipe, the selected plurality of dishes having a corresponding selected plurality of recipes, each recipe having a plurality of corresponding tasks; selecting at least one serving time associated with the meal, each serving time having one or more corresponding dishes that should be ready at that serving time; supplying the recipes corresponding to the selected plurality of dishes and the selected serving time(s) to a recipe integration computer; integrating the selected plurality of recipes into a single timeline by operation of the recipe integration computer, the single timeline having sequential tasks for the cook and corresponding times, the sequential tasks from all of the selected plurality of recipes being interleaved in time as needed to complete each dish at the serving time corresponding to it; and supplying the single timeline from the recipe integration computer to the cook such that the cook may prepare all of the selected plurality of dishes with reference to the single timeline.

Preferably, the cook selects the at least one serving time. Alternately, the recipe integration computer selects the at least one serving time. The process includes a step selected from the group consisting of displaying instructions for the sequential tasks at their corresponding times on a display operably connected to the recipe integration computer; and printing the instructions.

The integrating step includes a substep of de-conflicting tasks from each selected recipe with tasks from every other selected recipe such that the sequential tasks from all of the selected plurality of recipes allow the cook to do one task at a time.

The process includes supplying the recipe integration computer with a cook skill level and wherein greater time is allocated for some of the tasks when the cook skill level is relatively low and less time is allocated for some of the tasks when the cook skill level is relatively high.

In a particular embodiment of the process of the invention, the step of selecting of the plurality of dishes for food preparation as part of a meal is performed by a cook on a remote computer; and the process further includes the step of indicating the selected plurality of dishes in a network communication to the recipe integration computer; and wherein the supplying the single timeline from the recipe integration computer to the cook is via a network and the remote computer.

The present invention may alternately be described as a system for automatic food recipe integration including: a storage medium having a plurality of dishes and corresponding recipes; a selector operably connected to the storage medium for selecting a plurality of dishes for food preparation as part of a meal, the selected plurality of dishes having a corresponding selected plurality of recipes; a recipe integration computer operably connected to the selector and the storage medium for receiving the plurality of recipes, the recipe integration computer further operable to use at least one serving time associated with a meal, each serving time having one or more corresponding dishes that should be ready at that serving time, the recipe integration computer further operable to integrate the selected plurality of recipes into a single timeline, the single timeline having sequential tasks for the cook and corresponding times, the sequential tasks from all of the selected plurality of recipes being interleaved as needed to complete each dish at the serving time corresponding to it; and an output device operably connected to the recipe integration computer and operable to provide the single timeline from the recipe integration computer to the cook such that the cook may prepare all of the selected plurality of dishes with reference to the single timeline.

Preferably, the output device is a display and the food recipe computer is operable to cause the display to display instructions for the sequential tasks at their corresponding times. The recipe integration computer is further operable to de-conflict tasks from each selected recipe with tasks from every other selected recipe such that the sequential tasks from all of the selected plurality of recipes allow the cook to do one task at a time.

The system further includes a remote computer remote from the recipe integration computer, and wherein the selector and the output device are at the remote computer and operably connected to the recipe integration computer via a network, the remote computer being operable to indicate the selected plurality of dishes in an network communication to the recipe integration computer; and wherein the recipe integration computer is operable to provide the single timeline to the cook via a network and the remote computer. The selector is operable to select the at least one serving time. The selector is an input device associated with the recipe integration computer. The output device is associated with the recipe integration computer.

The present invention may alternately be described as a system for food recipe direction including: a storage medium having data for a plurality of dishes and corresponding recipes; a selector operably connected to the storage medium for selecting a plurality of dishes for food preparation as part of a meal, the selected plurality of dishes having a corresponding selected plurality of recipes; a recipe computer operably connected to the selector and the storage medium for receiving the plurality of recipes, the recipe computer further operable to use at least one serving time associated with a meal and a cook skill level, each serving time having one or more corresponding dishes that should be ready at that serving time, the recipe computer further operable to provide sequential tasks for the cook and corresponding times, the sequential tasks from all of the selected plurality of recipes being interleaved in time as needed to complete each dish at the serving time corresponding to it; and an output device connected to the recipe computer and operable to provide the cook with instructions corresponding to the sequential tasks; and wherein greater time is allocated for some of the tasks when the cook skill level is relatively low and less time is allocated for some of the tasks when the cook skill level is relatively high.

The system includes a remote computer remote from the recipe computer, and wherein the selector and the output device are at the remote computer and operably connected to the recipe computer via a network, the remote computer being operable to indicate the selected plurality of dishes in a network communication to the recipe computer; and wherein the recipe computer is operable to provide the instructions to the cook via the network and the remote computer. The recipe computer is further operable to de-conflict tasks from each selected recipe with tasks from every other selected recipe such that the sequential tasks from all of the selected plurality of recipes allow the cook to do one task at a time. The recipe computer is further operable to integrate the selected plurality of recipes into a single timeline.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 4 is an example of a single timeline combining recipes from several dishes into an integrated list as provided by the present invention;

DETAILED DESCRIPTION

Figure 1:
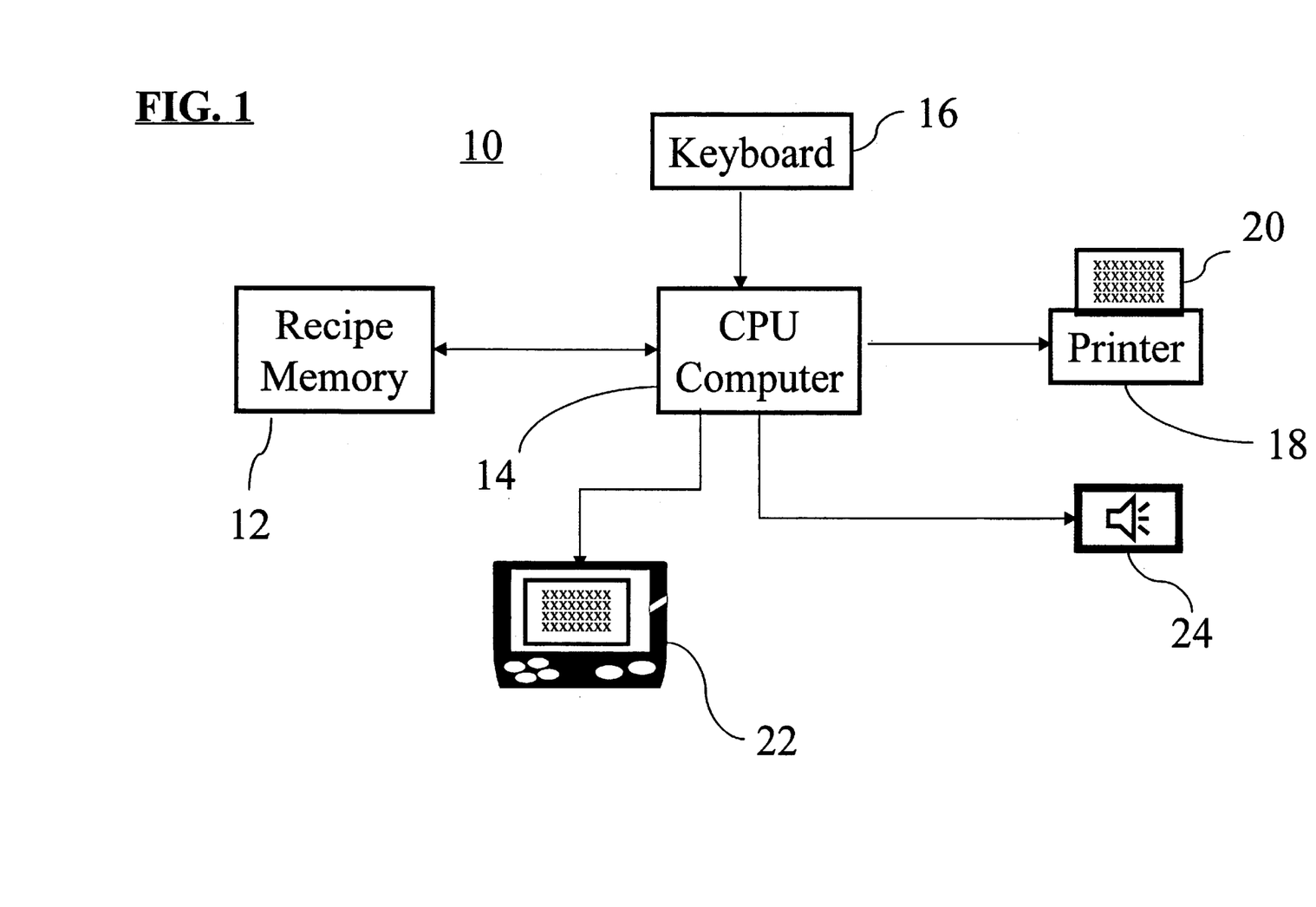
FIG. 1 is a simplified block diagram of a computer system according to a first embodiment of the present invention.

Turning initially to FIG. 1, the system 10 of the present invention includes a storage medium such as a memory 12 connected to a computer CPU 14. The storage medium, which might alternately be a CD-ROM, contains a large number of recipes with steps and timelines for preparing, cooking, and serving each dish. A keyboard 16 or other input device (mouse pointer, etc.) is used as a selector to select several of the recipes for a given meal. The CPU or recipe computer 14 may be a special purpose computer or a general purpose computer such as a personal computer with software to implement the present technique.

Computer 14 is also connected to a printer 18 which may print a single timeline 20 listing tasks for the plurality of dishes that have been selected to be prepared for a given meal (example FIG. 4). Additionally, the computer 14 is connected to a display such as monitor 22. It may display the single timeline with the illustrated vertical scroll bar such that a cook may easily scroll along the steps of the list before starting the meal. When the meal preparation process has started, the monitor 22 may display one or a few steps at a time with an audible indication through speaker 24 when the cook is to start a new task. Alternately or additionally, a flashing message will appear on the monitor 22 when the cook is to start a new task.

Figure 2:
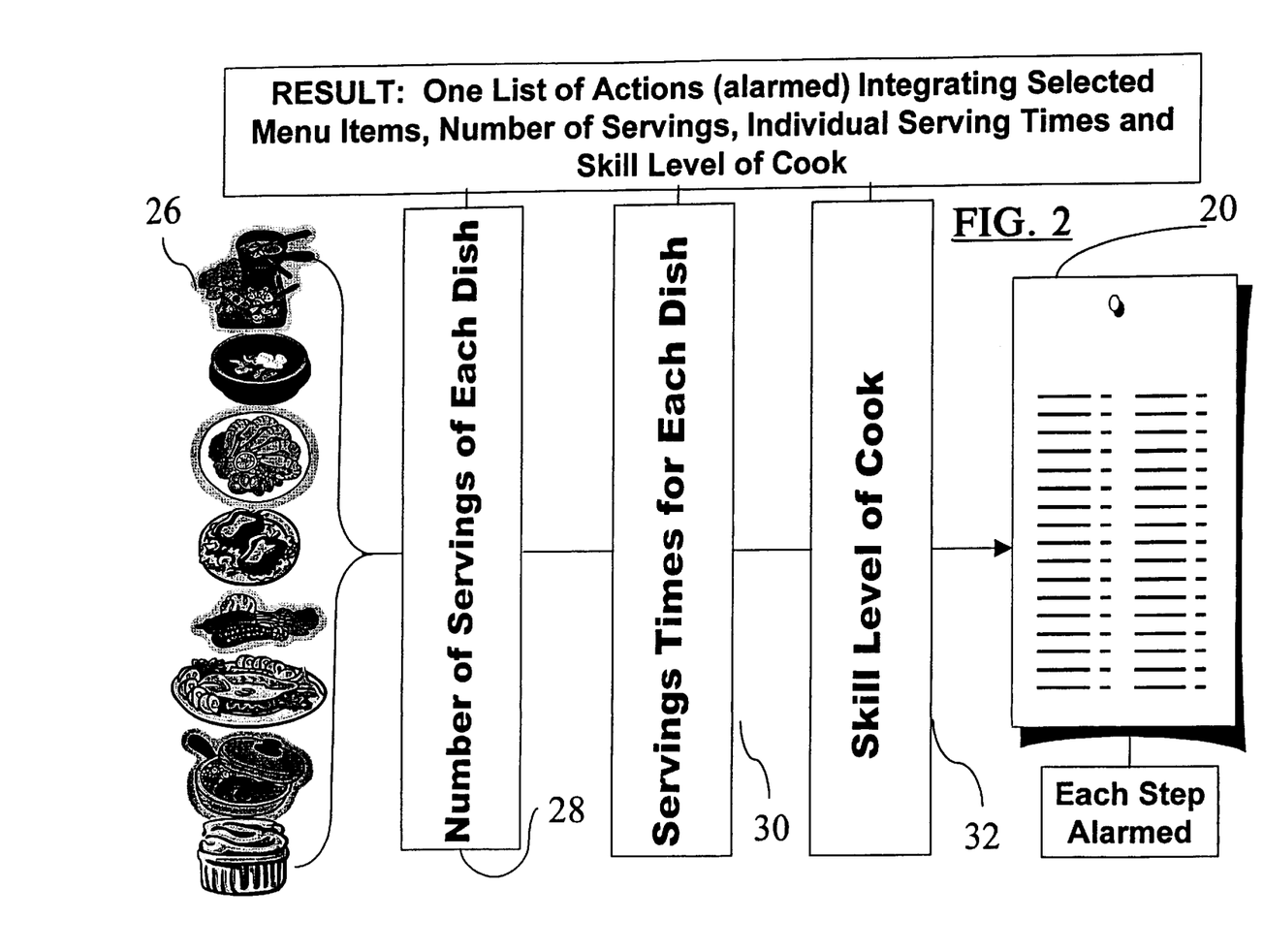
FIG. 2 is simplified illustration of the operation of the present invention.

As illustrated graphically in FIG. 2, the present technique involves a cook selecting various dishes 26 to be part of a meal. After selecting the dishes 26, step 28 has the cook inputting the number of servings for each dish. Next step 30 is where the cook could input the desired serving time for the dishes or at least some of them. There may be defaults where for example the desert is ready a set time after the main course. Additionally, the program will provide warnings if the cook is trying to make a meal requiring 2 hours of preparation in 1 hour. Step 32 has the cook input a value for self-assessment of his or her skill. Alternately, the cook would input a value for self-assessment only if it varies from a norm. The self-assessed and entered value or ratings may for example be "can't boil water" for true beginning cooks, simply "cook" for medium skill, and "chef" for cooks with high skill.

A single timeline list 20 may be printed or may be shown on a display (refer back to FIG. 1) with a sounding of an alarm and/or a flashing of a message at appropriate times such as when the cook should start a new step.

The software on CPU 14 allocates greater time for some or all of the steps in timeline 20 if the cook has input a value indicating low skill and allocates relatively less time if the cook has input a value indicating medium skill. If the cook has indicated that he or she has great skill, still less time would be allocated to some or all of the steps. For example, separating the egg yolk from the egg white may take longer (and thus need more time allocated to it) depending on the skill of a cook. In addition to allocating more time for some steps depending on the skill level of a cook, the timeline 20 may optionally provide greater details if the cook has input a value indicating low skill, fewer details if the cook has input a value indicating medium skill, and fewer details still if the cook has great skill.

Figure 3:
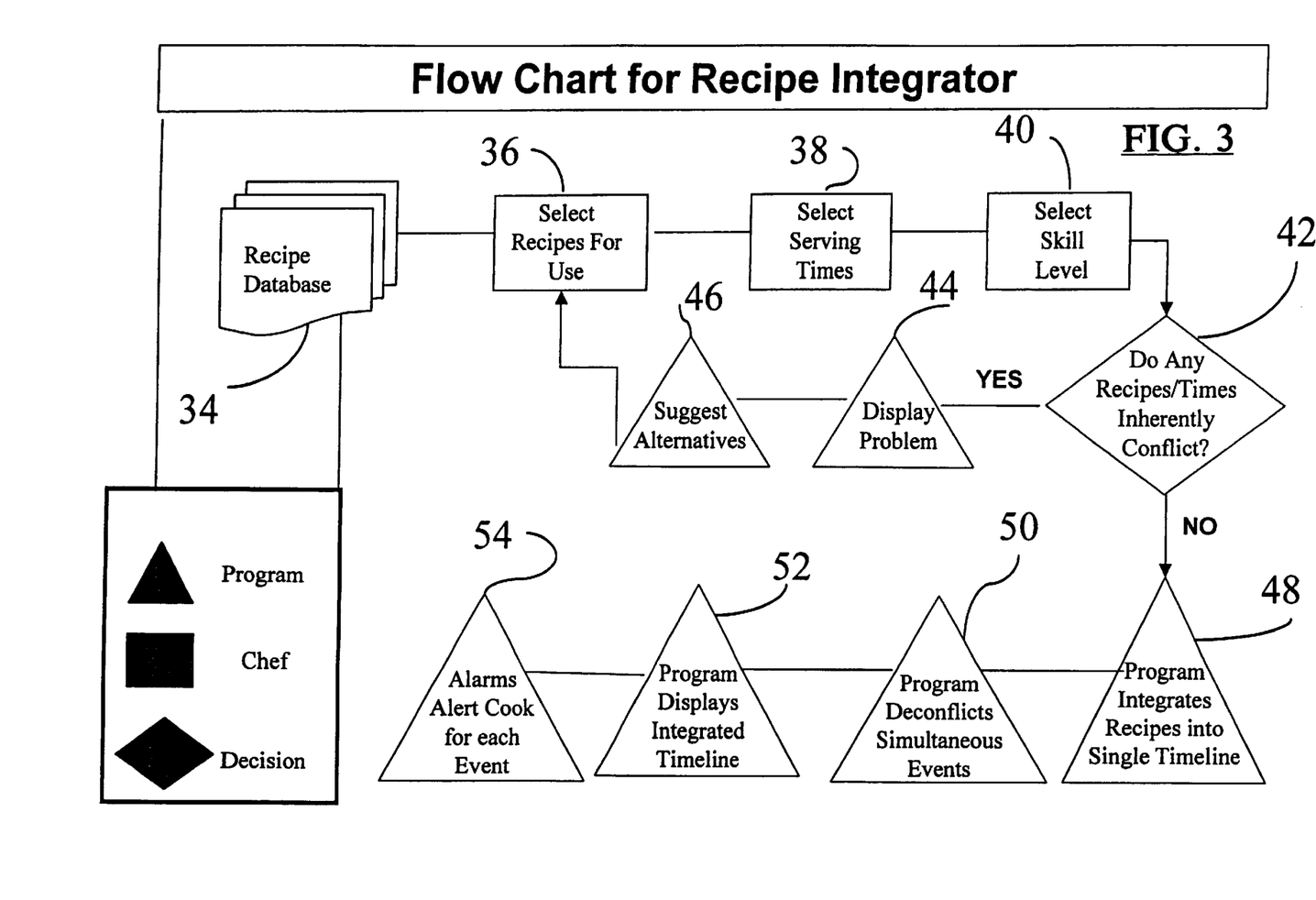
FIG. 3 is a flow chart showing the process according to the present invention.

FIG. 3 is a more detailed flow chart with rectangular blocks representing input supplied by the cook, triangular blocks representing steps of the computer, and parallelogram block representing a decision step by the computer. Block 34 represents the recipes in a database such as in a computer memory or CD-ROM. At block 36, the cook selects dishes from the database to be part of a meal. At block 38, the cook selects a desired serving time for one or more of the dishes. At block 40, the cook selects their personal skill level. At block 42, the program tests to determine if there are inherent conflicts in the selections made by the cook.

If block 42 detects inherent conflicts in the selections of the cook such as if the cook is trying to make a meal requiring 2 hours of preparation in 1 hour, block 44 displays (e.g., in the computer monitor) a warning and leads to block 46 which suggests alternatives. This leads back to block 36 such that the cook can enter new selections.

If block 42 does not show any inherent conflicts, control goes to block 48 where the program initially integrates the steps for the various dishes into a first pass single timeline. At block 50, the program de-conflicts simultaneous (i.e., requiring simultaneous action by cook on two different steps) events. For example, if the cook is required to break three eggs at the same time as stirring a soup, the program must make an adjustment in the first pass single timeline such that the cook can do one task at a time. At block 52, the revised single timeline is displayed either as a whole or one or a few steps visible at a time. Block 54 is the step of sounding the alarm when the cook must do each new task.

FIG. 4 is an example single timeline according to the present invention. The example shows the integration of three recipes (corresponding to souffle, spaghetti, and zucchini) into a single timeline that almost spans a 7 hour time interval. At each time listed on the right, the corresponding task (column that is second from left) should be done. The cook may simply consult with a printed version of the timeline such as illustrated in FIG. 4 and perform each task at the appropriate time. Alternately, each task may be highlighted (or displayed by itself) on the display (not shown in FIG. 4) at the appropriate time and, optionally, with a simultaneous alarm. The second column from the left represents the "countdown" time to the first serving time. Note that the active steps of the cook in the second column from the right are time-wise distinct from each other. That is, the cook is not required to take an active step on one dish when he or she is taking an active step on another dish. Importantly, the cook can refer to the single timeline, either in printed form or as displayed on a computer monitor for directions. There is no need to flip or switch from a recipe for one of the dishes to a recipe for another of the dishes during the cooking process.

Figure 5:
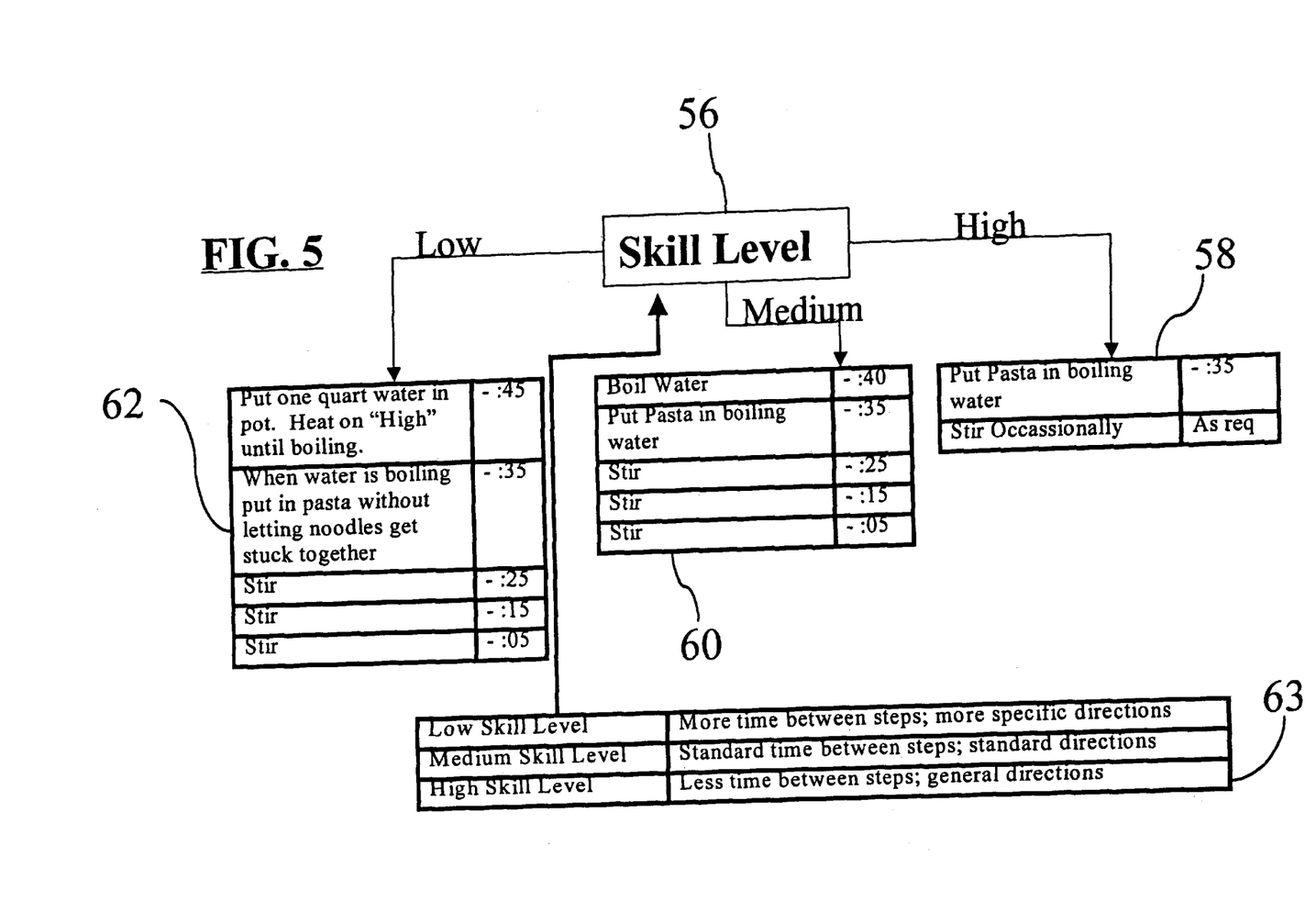
FIG. 5 is a block diagram illustrating how the present invention provides recipe tasks in greater or less detail and with more or less preparation time, depending on the skill level of a particular cook.

FIG. 5 shows more specifics of how the program may allocate less time to a cook with high skill (as self-assessed and input by the cook). Block 56 checks the skill level as previously input and leads to block 58 when the cook has a high skill level. Block 58 has a specific example where less time and less detailed instructions are provided for a high skilled cook. However, if block 56 shows medium skill, this leads to the example of block 60 which has more time and more details of the same task as in block 58. Finally, block 62 is the example when block 56 shows a low skill level. In that case, more time and/or more detailed instructions are provided than in block 60. Block 63 is simply a summary of the concept used in providing timelines.

Figure 6:
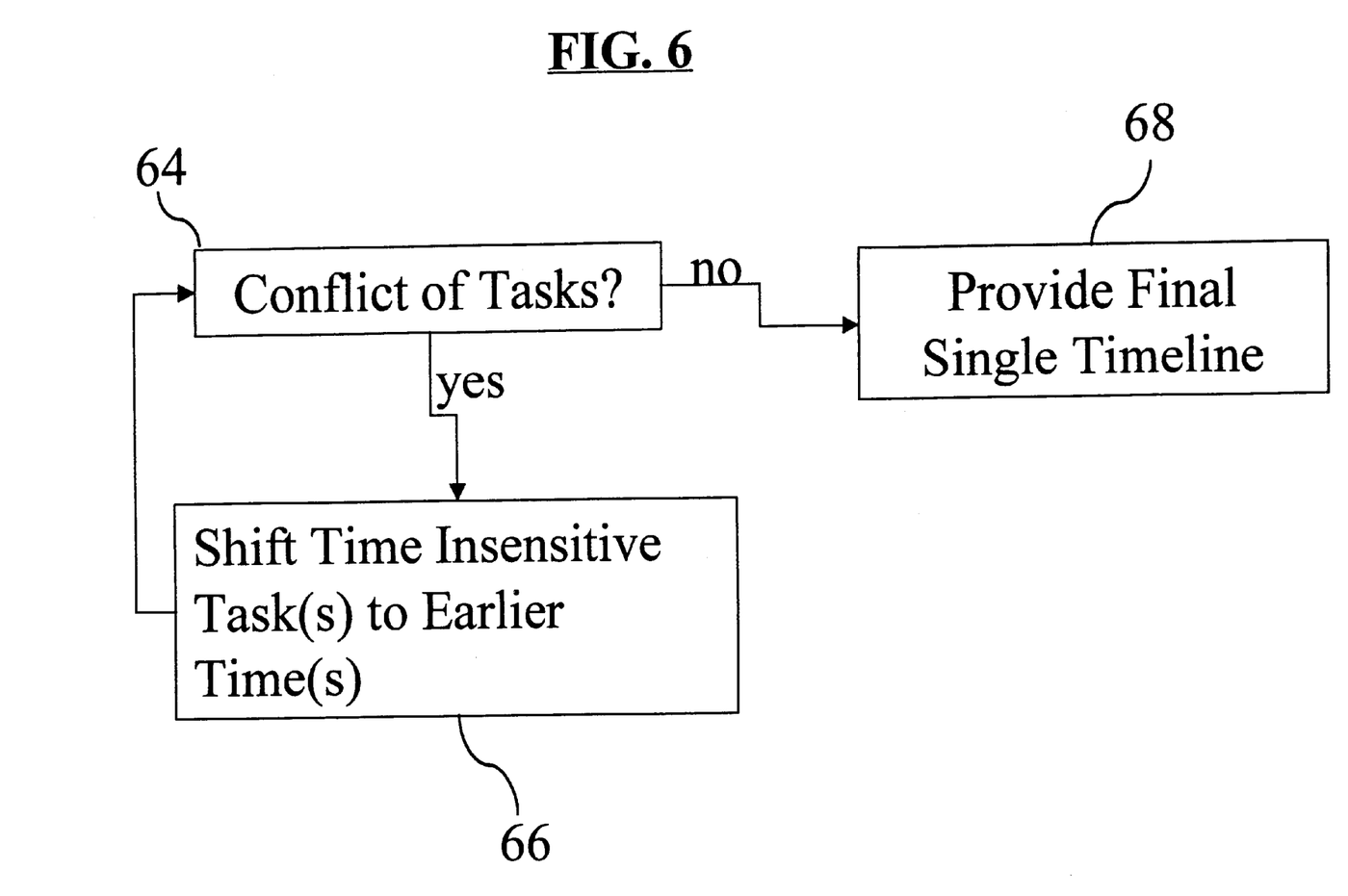
FIG. 6 is a flow chart of a de-conflicting process according to the present invention.
Figure 7:
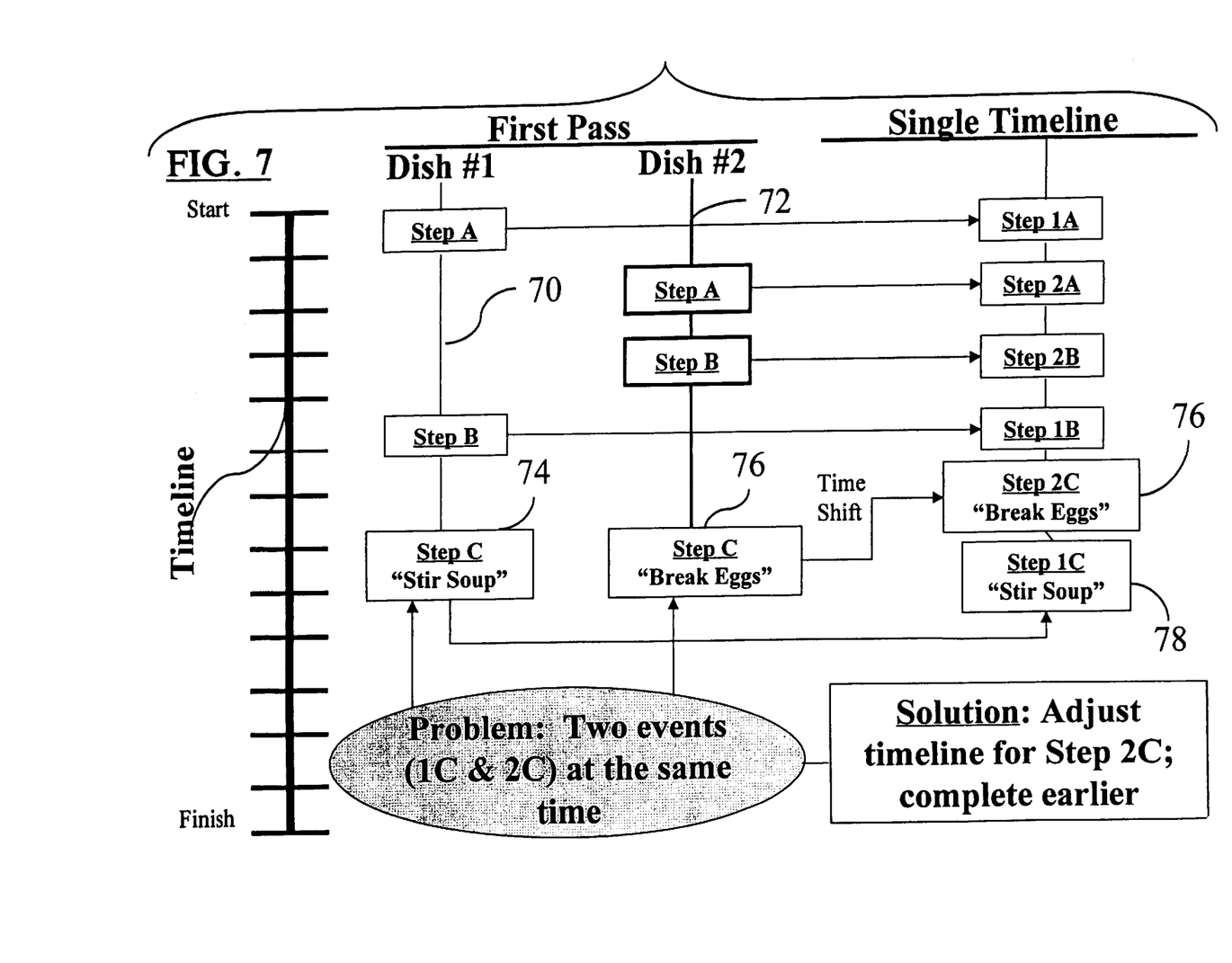
FIG. 7 is an illustration corresponding to the process of FIG. 6.

Turning to FIGS. 6 and 7, the de-conflicting technique will be discussed. If there is a conflict of tasks at block 64 meaning that the first integration of two or more recipes requires the cook to perform two tasks at the same time, control goes to block 66. In the example here, block 66 de-conflicts by simply shifting a time-insensitive task to an earlier time, but other rules could be used. Control passes from block 66 back to block 64. Assuming no other time conflicts, control goes to block 68 corresponding to a single timeline without a cook required to do two tasks (i.e., take two active steps) at the same time. This is illustrated in FIG. 7 having a vertical timeline and in which the vertical extent of the blocks indicate when a cook is required to perform an active step. Dish 1 has a sequence 70 of steps, whereas dish 2 has a sequence 72 of steps. The step 74 of stirring soup for dish 1 conflicts with step 76 of sequence 72. Therefore, when the two timelines corresponding to the two dishes are combined into a first pass single timeline (not shown), there is a conflict. Using the technique of time-shifting a time-insensitive step, the step 76 is shifted to an earlier time (right side of FIG. 7). Therefore, the single timeline 78 in its final version has step 76 at an earlier time. Conflicts are thus removed.

Figure 8:
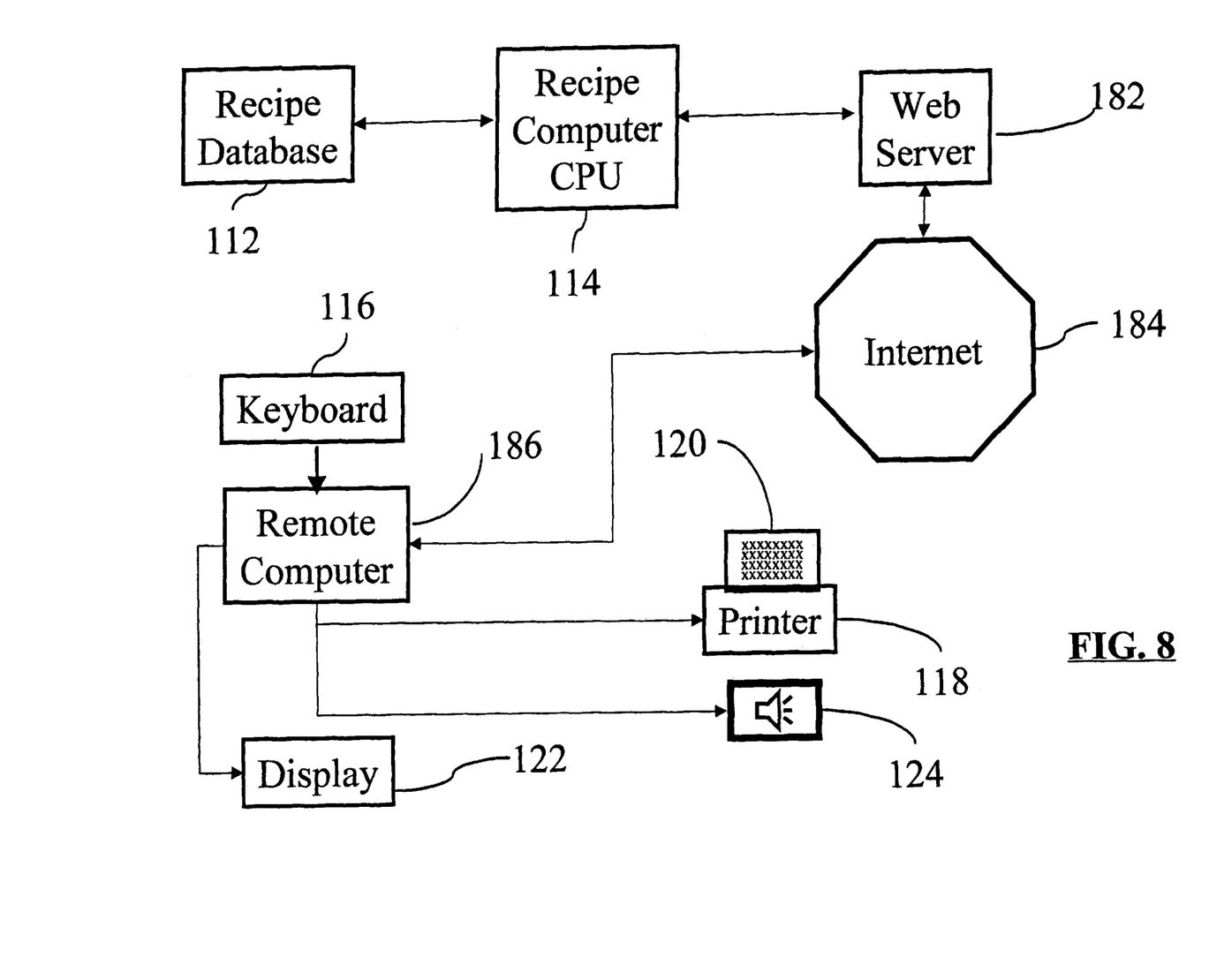
FIG. 8 is a block diagram illustrating a second embodiment of the present invention as implemented over the Internet.

Turning now to FIG. 8, a web based implementation of the present invention is illustrated. In this arrangement, components are numbered in the 100 series with the same last two digits as the corresponding component, if any, from the FIG. 1 arrangement. Thus, components 112, 114, 116, 118, 120, 122, and 124 operate in essentially the same fashion and are essentially identical to the corresponding components of FIG. 1 except for differences as discussed below. In particular, in this arrangement the recipe database 112 and recipe computer 114 are connected to a web server 182. The web server 182 connects to the Internet 184 and a remote computer 186. A cook at the remote computer 186 uses the keyboard 116 (or other input device such as a mouse) to select dishes, serving times, skill level, and number of servings in essentially the same fashion as in FIG. 1. However, in this case the cook remotely accesses the recipe computer 114 via the Internet. The web server 182 generates web pages based on selections by the cook at the remote computer using any of various known techniques (CGI, ASP, etc.) or any later developed technique. As in the FIG. 1 arrangement, the cook may print out a single timeline list and/or display a single timeline with the speaker 124 sounding an alarm at appropriate times to remind the person to perform tasks at the corresponding times.

The timelines 20 and 120 may include more than just text. Display 22 of FIG. 1 and display 122 of FIG. 8 may show helpful photographs, illustrations, video clips, film clips, animations, optionally with audio (output through speakers 24 and 124) such as spoken instructions and tips, may be provided. Visual materials such as photographs, illustrations or selected individual frames from a video, film, or animation clip could be printed to the timeline lists 20 and 120. Alternately or additionally, such audio-visual materials may be provided from displays 22 and 122 and speakers 24 and 124. The audio-visual files corresponding to a given timeline can automatically be called up for outputting (i.e., displaying visuals or sounding audio files) at the time for certain steps to occur. Alternately, the displays 22 and 122 may show the timeline with hypertext such that a cook may click on a link in order to show a visual and/or sound an audio instruction or other audio file.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended below.

What is claimed is:

1. A process for automatic food recipe integration as an aid to a cook, the steps comprising:

selecting a plurality of dishes for food preparation as part of a meal, each dish having a corresponding recipe, the selected plurality of dishes having a corresponding selected plurality of recipes, each recipe having a plurality of corresponding tasks;

selecting at least one serving time associated with the meal, each serving time having one or more corresponding dishes that should be ready at that serving time; m retrieving the recipes corresponding to the selected plurality of dishes and the selected serving time(s) to a recipe integration computer;

integrating the retrieved recipes into a single timeline by operation of the recipe integration computer, the single timeline having sequential tasks for the cook and corresponding times, the sequential tasks from all of the retrieved recipes being interleaved in time as needed to complete each dish at the serving time corresponding to it; and supplying the single timeline from the recipe integration computer to the cook such that the cook may prepare all of the selected plurality of dishes with reference to the single timeline.

2. The process of claim 1 wherein the cook selects the at least one serving time.

3. The process of claim 1 wherein the recipe integration computer selects the at least one serving time.

4. The process of claim 1 further comprising a step selected from a group consisting of: displaying instructions for the sequential tasks at their corresponding times on a display operably connected to the recipe integration computer; and printing the instructions.

5. The process of claim 4 wherein the integrating step comprises a substep of de-conflicting tasks from each selected recipe with tasks from every other selected recipe such that the sequential tasks from all of the selected plurality of recipes allow the cook to do one task at a time.

6. The process of claim 5 further comprising the step of supplying the recipe integration computer with a cook skill level and wherein greater time is allocated for some of the tasks when the cook skill level is relatively low and less time is allocated for some of the tasks when the cook skill level is relatively high.

7. The process of claim 6 wherein the cook selects the at least one serving time.

8. The process of claim 1 wherein the integrating step comprises a substep of de-conflicting tasks from each selected recipe with tasks from every other selected recipe such that the sequential tasks from all of the selected plurality of recipes allow the cook to do one task at a time.

9. The process of claim 1 further comprising the step of supplying the recipe integration computer with a cook skill level; and wherein greater time is allocated for some of the tasks when the cook skill level is relatively low and less time is allocated for some of the tasks when the cook skill level is relatively high; and wherein the supplying of a single timeline step supplies a single timeline with greater detail when the cook skill level is relatively low and with more detail when the cook skill level is relatively high.

10. The process of claim 1 wherein the step of selecting of the plurality of dishes for food preparation as part of a meal is performed by a cook on a remote computer; and further comprising the step of indicating the selected plurality of dishes in a network communication to the recipe integration computer; and wherein the supplying the single timeline from the recipe integration computer to the cook is via the network and the remote computer.

11. A system for automatic food recipe integration comprising:
   a storage medium having a plurality of dishes and corresponding recipes;
   a selector operably connected to the storage medium for selecting a plurality of dishes for food preparation as part of a meal, the selected plurality of dishes having a corresponding selected plurality of recipes;
   a recipe integration computer operably connected to the selector and the storage medium for receiving the plurality of recipes, the recipe integration computer further operable to use at least one serving time associated with a meal, each serving time having one or more corresponding dishes that should be ready at that serving time, the recipe integration computer further operable to integrate the selected plurality of recipes into a single timeline, the single timeline having sequential tasks for the cook and corresponding times, the sequential tasks from all of the selected plurality of recipes being interleaved as needed to complete each dish at the serving time corresponding to it; and
   an output device operably connected to the recipe integration computer and operable to provide the single timeline from the recipe integration computer to the cook such that the cook may prepare all of the selected plurality of dishes with reference to the single timeline.

12. The system for automatic food recipe integration of claim 11 wherein the output device is a display and the food recipe computer is operable to cause the display to display instructions for the sequential tasks at their corresponding times.

13. The system for automatic food recipe integration of claim 11 wherein the recipe integration computer is further operable to de-conflict tasks from each selected recipe with tasks from every other selected recipe such that the sequential tasks from all of the selected plurality of recipes allow the cook to do one task at a time.

14. The system for automatic food recipe integration of claim 13 further comprising a remote computer remote from the recipe integration computer, and wherein the selector and the output device are at the remote computer and operably connected to the recipe integration computer via a network, the remote computer being operable to indicate the selected plurality of dishes in a network communication to the recipe integration computer; and wherein the recipe integration computer is operable to provide the single timeline to the cook via the network and the remote computer.

15. The system for automatic food recipe integration of claim 14 wherein the output device is a display and the food recipe computer is operable to cause the display to display instructions for the sequential tasks at their corresponding times.

16. The system for automatic food recipe integration of claim 15 wherein the selector is operable to select the at least one serving time.

17. The system for automatic food recipe integration of claim 11 wherein the selector is operable to select the at least one serving time.

18. The system for automatic food recipe integration of claim 11 wherein the selector is an input device associated with the recipe integration computer.

19. The system for automatic food recipe integration of claim 11 wherein the output device is associated with the recipe integration computer.

20. The system for automatic food recipe integration of claim 11 further comprising a remote computer remote from the recipe integration computer, and wherein the selector and the output device are at the remote computer and operably connected to the recipe integration computer via a network, the remote computer being operable to indicate the selected plurality of dishes in a network communication to the recipe integration computer; and wherein the recipe integration computer is operable to provide the single timeline to the cook via the network and the remote computer.

21. A system for food recipe direction comprising:
   a storage medium having data for a plurality of dishes and corresponding recipes;
   a selector operably connected to the storage medium for selecting a plurality of dishes for food preparation as part of a meal, the selected plurality of dishes having a corresponding selected plurality of recipes;
   a recipe computer operably connected to the selector and the storage medium for receiving the plurality of recipes, the recipe computer further operable to use at least one serving time associated with a meal and a cook skill level, each serving time having one or more corresponding dishes that should be ready at that serving time, the recipe computer further operable to provide sequential tasks for the cook and corresponding times, the sequential tasks from all of the selected plurality of recipes being interleaved in time as needed to complete each dish at the serving time corresponding to it; and an output device connected to the recipe computer and operable to provide the cook with instructions corresponding to the sequential tasks; and wherein the recipe computer is operable such that greater time is allocated for some of the tasks when the cook skill level is relatively low and less time is allocated for some of the tasks when the cook skill level is relatively high.

22. The system for food recipe direction of claim 21 further comprising a remote computer remote from the recipe computer, and wherein the selector and the output device are at the remote computer and operably connected to the recipe computer via a network, the remote computer being operable to indicate the selected plurality of dishes in a network communication to the recipe computer; and wherein the recipe computer is operable to provide the instructions to the cook via the network and the remote computer.

23. The system for food recipe direction of claim 21 wherein the recipe computer is further operable to de-conflict tasks from each selected recipe with tasks from every other selected recipe such that the sequential tasks from all of the selected plurality of recipes allows the cook to do one task at a time.

24. The system for food recipe direction of claim 21 wherein the recipe computer is further operable to integrate the selected plurality of recipes into a single timeline.

* * * * *